(12) United States Patent
Boiko (10) Patent No.: US 7,035,695 B2
(45) Date of Patent: Apr. 25, 2006

(54) METHOD AND APPARATUS FOR TUNING A PID CONTROLLER

(75) Inventor: Igor Boiko, Calgary (CA)

(73) Assignee: IMB Controls Inc., Calgary (CA)

( * ) Notice: Subject to any disclaimer, the term of this patent is extended or adjusted under 35 U.S.C. 154(b) by 623 days.

(21) Appl. No.: 10/336,369

(22) Filed: Jan. 6, 2003

(65) Prior Publication Data

US 2003/0153990 A1   Aug. 14, 2003

Related U.S. Application Data

(60) Provisional application No. 60/349,695, filed on Jan. 22, 2002.

(51) Int. Cl.
*G05B 13/02* (2006.01)

(52) U.S. Cl. ............... 700/28; 700/29; 700/31; 700/41; 700/42; 700/43; 700/37; 700/50; 706/903; 706/906

(58) Field of Classification Search ............... 700/28, 700/29, 31, 41, 42, 43, 44, 45, 46, 37–39, 700/50; 706/903, 906
See application file for complete search history.

(56) References Cited

U.S. PATENT DOCUMENTS

| | | | |
|---|---|---|---|
| 4,466,054 A * | 8/1984 | Shigemasa et al. | 700/42 |
| 4,539,633 A * | 9/1985 | Shigemasa et al. | 700/42 |
| 4,754,391 A * | 6/1988 | Suzuki | 700/37 |
| 5,057,993 A * | 10/1991 | Kanda | 700/42 |
| 5,223,778 A * | 6/1993 | Svarovsky et al. | 318/610 |
| 5,229,699 A * | 7/1993 | Chu et al. | 318/610 |
| 5,283,729 A * | 2/1994 | Lloyd | 700/37 |
| 5,331,541 A * | 7/1994 | Ueda et al. | 700/42 |
| 5,568,377 A * | 10/1996 | Seem et al. | 700/37 |
| 5,587,899 A * | 12/1996 | Ho et al. | 700/37 |
| 5,742,503 A * | 4/1998 | Yu | 700/42 |
| 5,818,714 A * | 10/1998 | Zou et al. | 700/37 |
| 5,847,952 A * | 12/1998 | Samad | 700/48 |
| 5,971,579 A * | 10/1999 | Kim | 700/42 |
| 6,081,751 A * | 6/2000 | Luo et al. | 700/42 |

(Continued)

OTHER PUBLICATIONS

Boiko, Igor, "Application of the Locus of a Perturbed Relay System to Sliding Mode Relay Control Design" Sep. 25-27, 2000, Proceedings of the 2000 IEEE International Conference on Control Applications, Anchorage, Alaska, USA.*

(Continued)

*Primary Examiner*—Anthony Knight
*Assistant Examiner*—Thomas Pham (57) ABSTRACT

In tuning a controller for a process in a feedback control system, a method is provided for bringing the system into asymmetric self-excited oscillations for measuring the frequency of the oscillations, average over the period value of the process output signal and average over the period control signal and tuning the controller in dependence of the measurements obtained. An element having a non-linear characteristic is introduced into the system in series with the process and set point signal is applied to excite asymmetric self-excited oscillations in the system. An algorithm and formulas are given for identification of the process model having the form of first order plus dead time transfer function. PI controller settings are given as a function of the dead time/time constant ratio. An apparatus for performing the method is disclosed.

20 Claims, 6 Drawing Sheets

U.S. PATENT DOCUMENTS

| | | | |
|---|---|---|---|
| 6,330,484 B1 * | 12/2001 | Qin | 700/50 |
| 6,445,962 B1 * | 9/2002 | Blevins et al. | 700/37 |
| 6,510,351 B1 * | 1/2003 | Blevins et al. | 700/18 |
| 6,697,767 B1 * | 2/2004 | Wang et al. | 702/189 |
| 6,847,954 B1 * | 1/2005 | Wojsznis et al. | 706/23 |
| 6,937,908 B1 * | 8/2005 | Chang et al. | 700/37 |

OTHER PUBLICATIONS

Boiko, Igor, "Application of the Locus of a Perturbed Relay System to Analysis and Design of Relay Servo Systems with Nonlinear Plant" Jun. 25-27, 2001, Proceedings of the American Control Conference Arlington, VA.*

* cited by examiner

METHOD AND APPARATUS FOR TUNING A PID CONTROLLER

CROSS-REFERENCE TO RELATED APPLICATIONS
U.S. Patent Documents:

| | | | |
|---|---|---|---|
| 4214300 | July 1980 | Barlow et al. | 364/105. |
| 4549123 | October 1985 | Hagglund et al. | 364/157. |
| 4602326 | July 1986 | Kraus | 364/158. |
| 4754391 | June 1988 | Suzuki | 364/157. |
| 4836319 | June 1989 | Haseda et al. | 180/142. |
| Re33267 | July 1990 | Kraus | 364/158. |
| 5124626 | June 1992 | Thoen | 364/161. |
| 5222022 | June 1993 | Adams et al. | 364/431. |
| 5223778 | June 1993 | Svarovsky et al. | 364/157. |
| 5229699 | July 1993 | Chu et al. | 364/162. |
| 5283729 | February 1994 | Lloyd | 364/157. |
| 5311421 | May 1994 | Nomura et al. | 364/157. |
| 5325288 | June 1994 | Satou | 364/162. |
| 5396415 | March 1995 | Konar et al. | 364/162. |
| 5412557 | May 1995 | Lauw | 363/37. |
| 5453925 | September 1995 | Wojsznis et al. | 364/157. |
| 5535117 | July 1996 | Hiroi | 364/158. |
| 5568377 | October 1996 | Seem et al. | 364/157. |
| 5587899 | December 1996 | Ho et al. | 364/157. |
| 5587896 | December 1996 | Hansen et al. | 700/28 |
| 5742503 | April 1998 | Yu | 700/42 |
| 5649062 | July 1997 | Teng et al. | 706/23 |

OTHER REFERENCES

Cheng et al., 1999, Identification and Control of Nonlinear Systems Using Multiple Models: Relay Feedback Approach. Proc. American Control Conference 1999, 3327–3331.

Chiang et al., 1992, Derivation of Transfer Function from Relay Feedback Systems. Ind. Eng. Chem. Res. 31, 855–860.

Chiang et al., 1993, Monitoring procedure for Intelligent Control: On-Line Identification of Maximum Closed-Loop Log Modules. Ind. Eng. Chem. Res. 32.

De Arruda et al., 2000, Relay Base Closed Loop Transfer Function Estimation. Proc American Control Conference 2000, 1812–1816.

Haegglund et al., 1991, Industrial Adaptive Controllers Based on Frequency Response Techniques. Automatica 27, 599–609.

Kaya et al., 1999, A PI-PD Controller Design for Integrating Processes. Proc American Control Conference 1999, 258–262.

Li et al., 1991, An Improved Autotune Identification Method. Ind. Eng. Chem. Res. 30, 1530–1541.

Lin et al., 1993, Automatic Tuning and Gain Scheduling for PH Control. Chem. Eng. Sci. 48, 3159–3171.

Loh et al., 1994, Describing Function Matrix for Multivariable Systems and Its Use in Multiloop PI Design. J. Proc. Control 4, 115–120.

Luyben et al., 1987, Derivation of Transfer Functions For Highly Nonlinear Distillation Columns. Ind. Eng. Chem. Res. 26, 2490–2495.

Luyben et al., 1994, Non-linear Autotune Identification. Int. J. Control 59, 595–626.

Papastathopoulou et al., 1990, Tuning Controllers on Distillation Columns with Distillate-Bottoms Structure. Ind. Eng. Chem. Res. 29, 1859–1868.

Shen et al., 1992, Indirect Feedforward Control: Multivariable Systems. Chem. Eng. Sci. 47, 3085–3097.

Shen et al., 1994, Use of Relay-Feedback Test for Automatic Tuning of Multivariable Systems. AIChE J. 40, 627–646.

Wang et al, 2000, PI Tuning for Process with Large Dead Time. Proc. American Control Conference 2000, 4274–4278.

Wood et al., 1973., Terminal Composition Control of A Binary Distillation Column. Chem. Eng. Sci. 28, 707–720.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Autotuning of PID controllers based on relay feedback tests proposed by Astrom and Hagglund in 1981 (respective U.S. Pat. No. 4,549,123 issued in 1985) received a lot of attention after that (W. L. Luyben, "Derivation of Transfer Functions for Highly Nonlinear Distillation Columns", Ind. Eng. Chem. Res. 26, 1987, pp. 2490–2495; Tore Hagglund, Karl J. Astrom, "Industrial Adaptive Controllers Based on Frequency Response Techniques", Automatica 27, 1991, pp. 599–609). It identifies the important dynamic information, ultimate gain and ultimate frequency, in a straightforward manner. The success of this type of autotuners lies on the fact that they are simple and reliable. This features of the relay feedback autotuning have lead to a number of commercial autotuners (Tore Hagglund, Karl J. Astrom, "Industrial Adaptive Controllers Based on Frequency Response Techniques", Automatica 27, 1991, pp. 599–609) and industrial applications (H. S. Papastathopoulou, W. L. Luyben, "Tuning Controllers on Distillation Columns with the Distillate-Bottoms Structure", Ind. Eng. Chem. Res. 29, 1990, pp. 1859–1868).

Luyben (W. L. Luyben, "Derivation of Transfer Functions for Highly Nonlinear Distillation Columns", Ind. Eng. Chem. Res. 26, 1987, pp. 2490–2495) proposed the use of relay feedback tests for system identification. The ultimate gain and ultimate frequency from the relay feedback test are used to fit a typical transfer function (e.g., first-, second- or third order plus time delay system). This identification was successfully applied to highly nonlinear process, e.g., high purity distillation column. Despite the apparent success of autotune identification, it can lead to signification errors in the ultimate gain and ultimate frequency approximation (e.g., 5–20% error in R. C. Chiang, S. H. Shen, C. C. Yu, "Derivation of Transfer Function from Relay Feedback Systems", Ind. Eng Chem. Res. 31, 1992, pp. 855–860) for typical transfer functions in process control system. The errors come from the linear approximation (describing function method) to a nonlinear element. The square type of output from the relay is approximated with the principal harmonic from the Fourier series (Derek P. Atherton, "Nonlinear Control Engineering", Van Nostrand Reinhod: New York, 1982) and the ultimate gain is estimated accordingly. Several attempts were proposed to overcome this inaccuracy but didn't overcome the main source of inaccuracy—linear approximation of the relay element due to the use of describing function method model.

BRIEF SUMMARY OF THE INVENTION

The present invention completely eliminates this source of inaccuracy—on account of application of a precise model of the oscillatory process—via the use of the locus of a perturbed relay system (LPRS) method (Igor Boiko, "Input-output analysis of limit cycling relay feedback control systems," Proc. of 1999 American Control Conference, San Diego, USA, Omnipress, 1999, pp. 542–546; Igor Boiko, "Application of the locus of a perturbed relay system to sliding mode relay control design," Proc. of 2000 IEEE International Conference on Control Applications, Anchorage, Ark., USA, 2000, pp. 542–547; Igor Boiko, "Frequency Domain Approach to Analysis of Chattering and Disturbance Rejection in Sliding Mode Control," Proc. of World Multiconference on Systemics, Cybernetics and Informatics, Orlando, Fla., USA, Vol. XV, Part II, pp. 299–303) instead of describing function method. The present invention defines a method and an apparatus for bringing the system (comprising the process, nonlinear element and external source of constant set point signal) into asymmetric oscillations mode (further referred to as asymmetric relay feedback test) for determining (measuring) quantities essential for the tuning of the controller. The method is based on the measurement of the points of the LPRS from the asymmetric relay feedback test on the one hand and fitting of the LPRS obtained analytically to the measured LPRS via optimization of the process model parameters. For the process represented by the first order plus time delay transfer function, simple analytical formulas are derived. The invention includes all variations and combinations (P, PI, PD, PID, etc.) of the control types of PID controller but not limited to those types of controllers.

DETAILED DESCRIPTION OF THE INVENTION

Referring to the drawings, a description will be given of an embodiment of a controller autotuning method according to the present invention.

The PID-control stands for proportional, integrating and derivative control. It is very common for controlling industrial processes. PID-controllers are manufactured by various manufacturers in large quantities. Usually the controllers are based on microprocessors and proportional, integrating and derivative functions are normally implemented within a software. Nevertheless, the principal structure of a conventional PID-controller is retained and without loss of generality it is possible to consider a PID-controller as a parallel connection of three channels: proportional with gain $K_p$, integrating with gain $K_i$ and derivative with gain $K_d$. As a result, transfer function of the PID-controller is:

$$W_{pid}(s)=K_p+K_i/s+K_d s$$

Choice of gains $K_p$, $K_i$ and $K_d$ values is a subject of tuning if the controller is implemented as a PID-controller. There are established methods of tuning a PID-controller in dependence on the parameters of the process, for example Ziegler-Nichols's method of manual tuning, Hagglund-Astrom's relay feedback autotuning method. There are also a number of other methods of manual and automatic tuning. All those methods can be divided into parametric and non-parametric.

Parametric methods are based on a certain dynamic model of the process with unknown parameters. The process undergoes a test or a number of tests aimed at the process model parameters identification. Once the process model parameters are identified, the controller is tuned in accordance with known from the automatic control theory rules—to provide stability and required performance to the closed-loop system (comprising the process, the controller, the comparison device, and the feedback). Non-parametric methods are based on the tests on the process, which are aimed at the measurement of some general characteristics of the process, for example ultimate gain and ultimate frequency at both Ziegler-Nichols's method of manual tuning and Hagglund-Astrom's relay feedback autotuning method.

Generally, parametric methods can provide a better tuning quality (due to possibility of the use of more precise model of the process) but require more complex tests on the process. Therefore, there is a need for comparatively simple yet precise method of tuning (manual and automatic), which can be embedded into software of local controllers or distributed control system (DCS) or be implemented as a software for a personal computer used by an engineer who is supposed to tune the controllers.

Usually, methods of tuning that utilize Hagglund-Astrom's relay feedback test for estimating the parameters of oscillations are based on describing function method (Derek P. Atherton, "Nonlinear Control Engineering", Van Nostrand Reinhod: New York, 1982). The use of this method is limited to harmonic oscillations in the system, which is normally not the case.

The present invention is based on the model of oscillations provided by the LPRS method (Igor Boiko, "Input-output analysis of limit cycling relay feedback control systems," Proc. of 1999 American Control Conference, San Diego, USA, Omnipress, 1999, pp. 542–546; Igor Boiko, "Application of the locus of a perturbed relay system to sliding mode relay control design," Proc. of 2000 IEEE International Conference on Control Applications, Anchorage, Ark., USA, 2000, pp. 542–547; Igor Boiko, "Frequency Domain Approach to Analysis of Chattering and Disturbance Rejection in Sliding Mode Control," Proc. of World Multiconference on Systemics, Cybernetics and Informatics, Orlando, Fla., USA, Vol. XV, Part II, pp. 299–303), which doesn't use the above limiting hypothesis. The present invention provides a relatively simple parametric method of controller tuning. The method uses a modified Hagglund-Astrom's relay feedback test as means to identify parameters of a process model. A process can be modeled by a transfer function with a dead time (time delay) or without it or have a matrix state space description.

Figure 1:
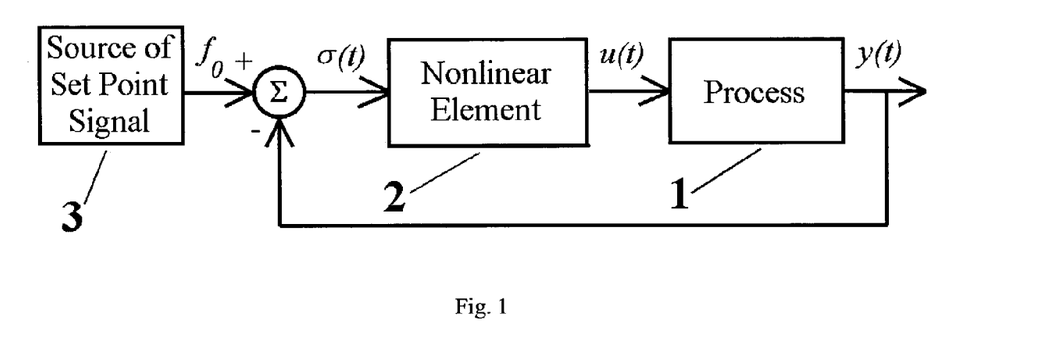
FIG. 1. The system that comprises the nonlinear element, the process, and the source of the set point signal.
Figure 2A:
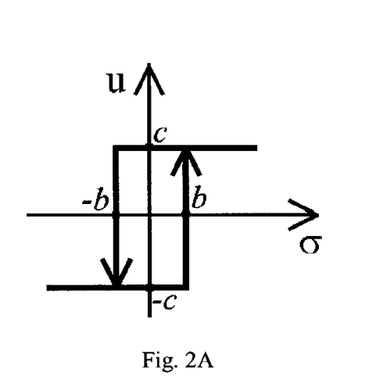
FIGS. 2A and 2B. Input-output relationship for symmetric hysteresis relay and asymmetric hysteresis relay.
Figure 2B:
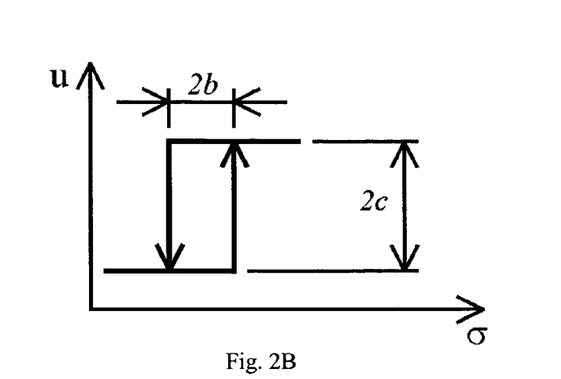

According to the present invention, a method is provided where the process has a transfer function $W_p(s)$ or a matrix state space description and the system (FIG. 1)—via introduction a nonlinear element 2 in series with the process 1 and applying a set point signal 3 to the closed-loop system—is brought in asymmetric self-excited oscillations mode for measuring the frequency of the oscillations, average over the period value of the process output signal and average over the period control signal whereupon the controller is tuned in dependence on the measurements obtained. An element having a non-linear (relay) characteristic (FIG. 2A or 2B) is introduced into the system in series with the process and set point signal is applied to excite asymmetric self-excited oscillations in the system. If the nonlinear element has an asymmetric relay characteristic the system should be transformed into an equivalent relay system with a symmetric relay characteristic—with the use of known from the automatic control theory techniques.

Figure 3:
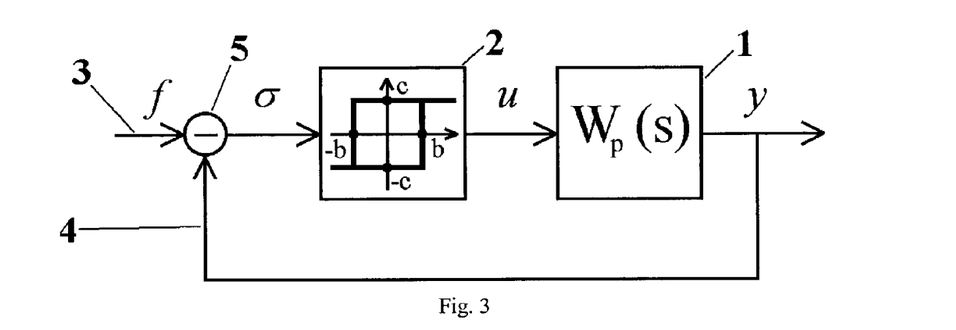
FIG. 3. Block diagram of a relay feedback system.

It is proved (Igor Boiko, "Input-output analysis of limit cycling relay feedback control systems," Proc. of 1999 American Control Conference, San Diego, USA, Omnipress, 1999, pp. 542–546; Igor Boiko, "Frequency Domain Approach to Analysis of Chattering and Disturbance Rejection in Sliding Mode Control," Proc. of World Multiconference on Systemics, Cybernetics and Informatics, Orlando, Fla., USA, Vol. XV, Part II, pp. 299–303) that asymmetric self-excited oscillations in the relay feedback system (FIG. 3) comprising the process transfer function 1, the relay 2, the set point signal 3, the feedback 4, and the comparison device 5 can be described by the LPRS. The LPRS is a characteristic of a relay feedback system that has the following definition:

$$J(\omega) = -0.5 \lim_{f_0 \to 0} \frac{\sigma_0}{u_0} + j\frac{\pi}{4c} \lim_{f_0 \to 0} y(t)\big|_{t=0} \quad (1)$$

where $f_0$ is the set point, $\sigma_0$ and $u_0$ are constant terms of error signal $\sigma(t)$ and control $u(t)$ respectively, $c$ is the amplitude of the relay, $\omega$ is the frequency of the oscillations, which can be varied by means of varying the hysteresis $b$ of the relay.

The LPRS is related with a transfer function of the linear part of a relay feedback system, and for a given transfer function $W(s)$ of the linear part of a relay feedback system the LPRS $J(\omega)$ can be calculated via the use of one of the following formulas and techniques (Igor Boiko, "Input-output analysis of limit cycling relay feedback control systems," Proc. of 1999 American Control Conference, San Diego, USA, Omnipress, 1999, pp. 542–546; Igor Boiko, "Application of the locus of a perturbed relay system to sliding mode relay control design," Proc. of 2000 IEEE International Conference on Control Applications, Anchorage, Ark., USA, 2000, pp. 542–547; Igor Boiko, "Frequency Domain Approach to Analysis of Chattering and Disturbance Rejection in Sliding Mode Control," Proc. of World Multiconference on Systemics, Cybernetics and Informatics, Orlando, Fla., USA, Vol. XV, Part II, pp. 299–303):

a) The LPRS can be calculated as a series of transfer function values at multiple frequencies—according to the formula:

$$J(\omega) = \sum_{k=1}^{\infty} k^m (-1)^{k+1} \operatorname{Re} W(k\omega) + j\sum_{k=1}^{\infty} \frac{1}{2k-1} \operatorname{Im} W[(2k-1)\omega] \quad (2)$$

where $W(s)$ is the transfer function of the linear part of the system (of the process in this case), $m=0$ for type zero (non-integrating process) and $m=1$ for non-zero type servo system (integrating process). For realization of this technique, summation should be done from $k=1$ to $k=M_1$ and $M_2$ where $M_1$ and $M_2$ are sufficiently large numbers for the finite series being a good approximation of the infinite one.

b) The LPRS can be calculated with the use of the following technique. Firstly, transfer function is represented as a sum of m transfer functions of $1^{st}$ and $2^{nd}$ order elements (expanded into partial fractions):

$W(s) = W_1(s) + W_2(s) + W_3(s) + \ldots + W_m(s)$

Secondly, for each transfer function, respective LPRSs (the partial LPRSs) are calculated with the use of formulas of Table 1.

TABLE 1

Formulas of LPRS $J(\omega)$

| Transfer function $W(s)$ | LPRS $J(\omega)$ |
|---|---|
| $K/s$ | $0 - j\pi^2 K/(8\omega)$ |
| $K/(Ts + 1)$ | $0.5K(1 - \alpha\operatorname{cosech}\alpha) - j0.25\pi K\operatorname{th}(\alpha/2),\ \alpha = \pi/(T\omega)$ |
| $K/[(T_1 s + 1)(T_2 s + 1)]$ | $0.5K[1 - T_1/(T_1 - T_2)\alpha_1 \operatorname{cosech}\alpha_1 - T_2/(T_2 - T_1)\alpha_2 \operatorname{cosech}\alpha_2)] - j0.25\pi K/(T_1 - T_2)[T_1 \operatorname{th}(\alpha_1/2) - T_2 \operatorname{th}(\alpha_2/2)],\ \alpha_1 = \pi/(T_1\omega),\ \alpha_2 = \pi/(T_2\omega)$ |
| $K/(s^2 + 2\xi s + 1)$ | $0.5 K[(1 - (B + \gamma C)/(\sin^2\beta + \operatorname{sh}^2\alpha)] - j0.25\pi K(\operatorname{sh}\alpha - \gamma\sin\beta)/(\operatorname{ch}\alpha + \cos\beta)$ $\alpha = \pi\xi/\omega,\ \beta = \pi(1 - \xi^2)^{1/2}/\omega,\ \gamma = \alpha/\beta,$ $\beta = \alpha\cos\beta\operatorname{sh}\alpha + \beta\sin\beta\operatorname{ch}\alpha\alpha,\ C = \alpha\sin\beta\operatorname{ch}\alpha - \beta\cos\beta\operatorname{sh}\alpha$ |
| $Ks/(s^2 + 2\xi s + 1)$ | $0.5K[\xi(\beta + \gamma C) - \pi/\omega \cos\beta\operatorname{sh}\alpha]/(\sin^2\beta + \operatorname{sh}^2\alpha)] - j0.25 K\pi(1 - \xi^2)^{-1/2}\sin\beta/(\operatorname{ch}\alpha + \cos\beta)$ $\alpha = \pi\xi/\omega,\ \beta = \pi(1 - \xi^2)^{1/2}/\omega,\ \gamma = \alpha/\beta,$ $\beta = \alpha\cos\beta\operatorname{sh}\alpha + \beta\sin\beta\operatorname{ch}\alpha,\ C = \alpha\sin\beta\operatorname{ch}\alpha - \beta\cos\beta\operatorname{sh}\alpha,$ |
| $Ks/(s + 1)^2$ | $0.5K[\alpha(-\operatorname{sh}\alpha + \alpha\operatorname{ch}\alpha)/\operatorname{sh}^2\alpha - j0.25\pi\alpha/(1 + \operatorname{ch}\alpha)],\ \alpha = \pi/\omega$ |
| $Ks/[(T_1 s + 1)(T_2 s + 1)]$ | $0.5K/(T_2 - T_1)[\alpha_2 \operatorname{cosech}\alpha_2 - \alpha_1 \operatorname{cosech}\alpha_1] - j0.25 K\pi/(T_2 - T_1)[\operatorname{th}(\alpha_1/2) - \operatorname{th}(\alpha_2/2)],\ \alpha_1 = \pi/(T_1\omega),\ \alpha_2 = \pi/(T_2\omega)$ |

Thirdly, the LPRS is calculated as a sum of all partial LPRSs:

$J(\omega) = J_1(\omega) + J_2(\omega) + J_3(\omega) + \ldots + J_m(\omega)$ c) For matrix state space description, the LPRS for type 0 servo systems is calculated with the use of formula (3):

$$J(\omega) = -0.5C\left[A^{-1} + \frac{2\pi}{\omega}\left(I - e^{\frac{2\pi}{\omega}A}\right)^{-1} e^{\frac{\pi}{\omega}A}\right]B + j\frac{\pi}{4}C\left(I + e^{\frac{\pi}{\omega}A}\right)^{-1}\left(I - e^{\frac{\pi}{\omega}A}\right)A^{-1}B \quad (3)$$

where A, B and C are matrices of the following state space description of a relay system:

$$\dot{x} = Ax + Bu$$

$$y = Cx$$

$$u = \begin{cases} +1 & \text{if } \sigma = f_0 - y > b, \dot{\sigma} > 0 \\ -1 & \text{if } \sigma = f_0 - y < -b, \dot{\sigma} < 0 \end{cases}$$

where A is an n×n matrix, B is an n×1 matrix, C is an 1×n matrix, $f_0$ is the set point, $\sigma$ is the error signal, $2b$ is the hysteresis of the relay function, x is the state vector, y is the process output, u is the control, n is the order of the system;

or the LPRS for type 1 (integrating process) servo systems is calculated with the use of formula (4):

$$J(\omega) = 0.25 CA^{-2}\left\{(I-D^2)^{-1}\left[D^2 - \left(I + \frac{4\pi}{\omega}A\right)D + D^3 - I\right] + D - I\right\}B + j\frac{\pi}{8}CA^{-1}\left\{\frac{\pi}{\omega} + A^{-1}[(I-D^2)^{-1} \cdot (3D^2 - 3D - D^3 + I) - D + I]\right\}B, \quad (4)$$

where $$D = e^{\frac{\pi}{\omega}A},$$

A, B and C are matrices of the following state space description of a relay system:

$$\dot{x} = Ax + Bu$$

$$\dot{y} = Cx - f_0$$

$$u = \begin{cases} +1 & \text{if } \sigma = -y > b, \dot{\sigma} > 0 \\ -1 & \text{if } \sigma = -y < -b, \dot{\sigma} < 0 \end{cases}$$

where A is an (n−1)×(n−1) matrix, B is an (n−1)×1 matrix, C is an 1×(n−1) matrix, n is the order of the system.

Figure 4:
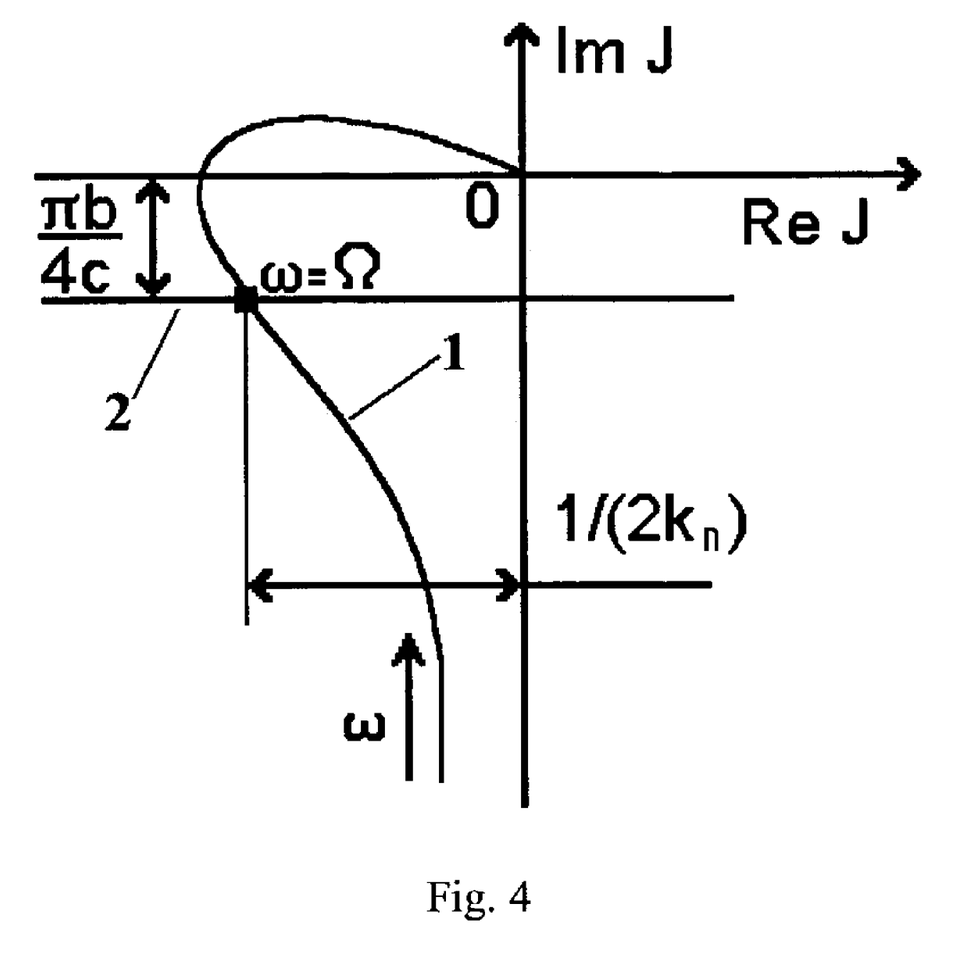
FIG. 4. LPRS and determination of the frequency of oscillations.

Any of the three techniques presented above can be used for the LPRS calculation. If the LPRS is calculated (FIG. 4) the frequency of oscillations $\Omega$ and the equivalent gain of the relay $k_n$ can be easily determined. In a relay feedback system, the following equalities are true (directly follow from the LPRS definition above; detailed consideration is given in the paper: I. Boiko, "Input-output analysis of limit cycling relay feedback control systems," Proc. of 1999 American Control Conference, San Diego, USA, Omnipress, 1999, pp. 542–546):

$$\text{Im} J(\Omega) = -\frac{\pi b}{4c}, \quad (5)$$

$$k_n = -\frac{1}{2\text{Re} J(\Omega)} \quad (6)$$

The frequency of oscillations $\Omega$ corresponds to the point of intersection of the LPRS 1 and the line 2 parallel to the real axis that lies below it at the distance of $\pi b/(4c)$. Therefore, by measuring frequency of oscillations $\Omega$, average over the period process output $y_0$ and average over the period control signal $u_0$ we can calculate average over the period value of the error signal: $\sigma_0 = f_0 - y_0$, the equivalent gain of the relay $k_n = u_0/\sigma_0$ (although this is not an exact value the experiments prove that it is a very good approximation even if $u_0$ and $\sigma_0$ are not small; the smaller $u_0$ and $\sigma_0$ the more precise value of $k_n$ we obtain), the static gain of the process $K = y_0/u_0$, and identify one point of the LPRS—at frequency $\Omega$:

$$J(\Omega) = -0.5(f_0 - y_0)/u_0 - j \pi b/(4c) \quad (7)$$

If the model of the process contains only 2 unknown parameters (beside static gain K), those two parameters can be found from complex equation (7), which corresponds to finding a point of the LPRS at frequency $\omega = \Omega$.

If the process model contains more than three unknown parameters, two or more asymmetric relay feedback tests—each with different hysteresis b of the relay element—should be carried out. As a result, each experiment provides one point of the LPRS, and N experiments provide N points of the LPRS on the complex plane enabling up to 2N unknown parameters (beside static gain K) to be determined.

One particular process model is worth an individual consideration. The first reason is that it is a good approximation of many processes. The second reason is—this process model allows for a simple semi-analytical solution. The process transfer function $W_p(s)$ is sought to be of $1^{st}$ order with a dead time:

$$W_p(s) = K \exp(-\tau s)/(Ts+1) \quad (8)$$

The LPRS for this transfer function is given by:

$$J(\omega) = \frac{K}{2}(1 - \alpha e^{\gamma} \text{cosech}\alpha) + j\frac{\pi}{4}K\left(\frac{2e^{-\alpha}e^{\gamma}}{1 + e^{-\alpha}} - 1\right) \quad (9)$$

where K is a static gain, T is a time constant, $\tau$ is the dead time, $\alpha = \pi/\omega T$, $\gamma = \tau/T$ With the measured values $\Omega$, $y_0$ and $u_0$ and known $f_0$, b and c, parameters K, T and $\tau$ of the approximating transfer function are calculated as per the following algorithm:

(a) at first the static gain K is calculated as:

$$K = \frac{y_0}{u_0}; \quad (10)$$

(b) then the following equation is solved for $\alpha$:

$$\frac{y_0}{f_0} = \frac{1 - e^{-\alpha}}{\alpha}; \quad (11)$$

(c) after that time constant T is calculated as:

$$T = \frac{\pi}{\alpha \Omega}; \quad (12)$$

(d) and finally dead time τ is calculated as:

$$\tau = T\ln\left[\frac{1}{2}(e^\alpha + 1)\right] \quad (13)$$

The most time consuming part of the above algorithm is solving equation (11). This is a nonlinear algebraic equation and all known methods can be applied for its solution.

With the parameters K, T and τ of the approximating transfer function identified, PI controller can be easily designed. The following tuning algorithm/values are proposed. Proportional gain $K_p$ and integrator gain $K_i$ in PI control are calculated as follows. For desired overshoot being a constraint, proportional gain $K_p$ and integrator gain $K_i$ are sought as a solution of the parameter optimization (minimization) problem with settling time being an objective function. This allows to obtain a minimal settling time at the step response as well as appropriate stability margins at any law of set point change.

A simplified solution of this problem is proposed by this invention too. It is proposed that quasi-optimal settings are used instead of optimal settings. Those are obtained as a solution of the above formulated optimization problem and respective approximation. Gains $K_p$ and $K_i$ as functions of desired overshoot are approximated. At first normalized values of $K_p$ and $K_i$ denoted as $K^o_p$ and $K^o_i$ should be calculated as follows:

At first the normalized time constants are calculate as per the following formulas:

For desired overshoot 20% integrator time constant is calculated as $$T^o_i = 1.60\tau/T; \quad (14)$$

for desired overshoot $$10\%: T^o_i = 1.80\tau/T; \quad (15)$$

for desired overshoot $$5\%: T^o_i = 1.95\tau/T. \quad (16)$$

After that normalized gains $K^o_i$ are to be calculated as reciprocals of the respective time constants:

$$K^o_i = 1/T^o_i$$

Normalized proportional gain $K^o_p$ is to be taken from Table 2 with in-between values determined via interpolation.

basis of two asymmetric relay feedback tests—each with different average over the period control signal—as a quotient of the increment of average over the period process output signal and increment of average over the period control signal.

Sometimes the process has a nonlinear character. In this case multiple asymmetric relay feedback tests are to be performed with decreasing values of the output amplitude of the relay—with the purpose to obtain a better local approximation of the process. Parameters of the process transfer function corresponding to a local linear approximation of the process are found as a solution of equations (7), (10) where the process model is expressed as a formula of the LPRS and contains the parameters to be identified.

More complex models of the process can also be used. If the process model has more than 3 unknown parameters, multiple asymmetric relay feedback tests are performed with different values of hysteresis $b_k$ (k=1, 2 . . . ) of the relay—with the purpose to identify several points of the LPRS:

$$\mathrm{Re}J(\Omega_k) = -\frac{1}{2}\frac{f_0 - y_{0k}}{u_{0k}} \quad (17)$$

$$\mathrm{Im}J(\Omega_k) = -\pi b_k/(4c) \quad (18)$$

where $\Omega_k$, $y_{0k}$, $u_{0k}$ are $\Omega$, $y_0$, $u_0$ corresponding to k-th asymmetric relay feedback test.

Each experiment allows for identification of one point of the LPRS and consequently of two parameters (beside the static gain). As a result, 2N+1 unknown parameters can be identified from N asymmetric relay feedback tests via solution of 2N+1 nonlinear algebraic equations (10), (17), (18) with the unknown parameters expressed through a formula of the LPRS. Therefore, the number of asymmetric relay feedback tests can be planned accordingly, depending on the number of unknown parameters.

Alternatively, parameters of process transfer function are to be found as least squares criterion (or with the use of another criterion) approximation of the LPRS—if the number of unknown parameters of the process is less than 2N+1 (where N is the number of asymmetric relay feedback tests). In other words, the LPRS represented via certain process model parameters is fitted to the LPRS points obtained through the asymmetric relay feedback tests.

TABLE 2

Quasi-optimal settings of PI controller (proportional gain $K^o_p$)

| Overshoot [%] | τ/T = 0.1 | τ/T = 0.2 | τ/T = 0.3 | τ/T = 0.4 | τ/T = 0.5 | τ/T = 0.6 | τ/T = 0.7 | τ/T = 0.8 | τ/T = 0.9 | τ/T = 1.0 | τ/T = 1.5 |
|---|---|---|---|---|---|---|---|---|---|---|---|
| 20 | $K^o_p$ = 7.177 | 3.702 | 2.564 | 2.007 | 1.683 | 1.473 | 1.329 | 1.225 | 1.146 | 1.086 | 0.915 |
| 10 | $K^o_p$ = 5.957 | 3.058 | 2.120 | 1.673 | 1.419 | 1.258 | 1.148 | 1.068 | 1.008 | 0.963 | 0.833 |
| 5  | $K^o_p$ = 5.203 | 2.624 | 1.823 | 1.483 | 1.294 | 1.170 | 1.082 | 1.014 | 0.964 | 0.924 | 0.808 |

Finally, $K_p$ and $K_i$ are calculated as $K_p = K^o_p/K$ and $K_i = K^o_i/T/K$ where K is the static gain of the process determined by (10), T is the time constant determined by (12). Formulas (14)–(16) and Table 2 give quasi-optimal normalized values of PI controller settings for a desired overshoot.

Figure 5:
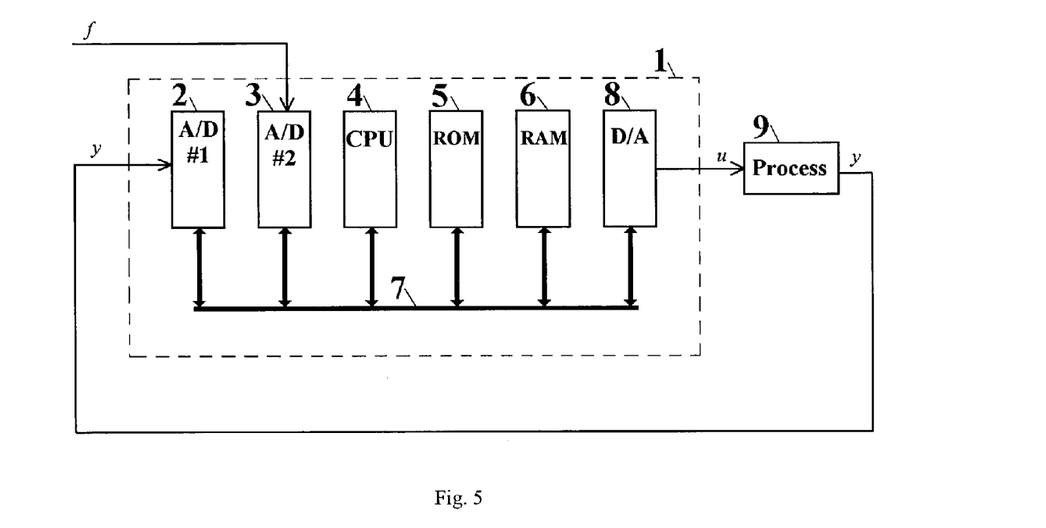
FIG. 5. Block diagram of the controller and of the process.

In some cases an external unknown constant or slowly changing disturbance (static load) is applied to the process. In that case the static gain of the process is calculated on the Eventually, the designed self-tuning PID (or another type) controller is supposed to be realized as a processor based (micro-computer or controller) device and all above formulas, the nonlinear element, the tuning rules are realized as computer programs with the use of applicable programming languages. The preferred embodiment of the controller is depicted in FIG. 5. The controller 1 has two A/D converters 2 and 3 on its input for the process output and set point signals respectively (alternatively it may have only one A/D converter for the process output signal, and the set point may be realized within the controller software), a processor (CPU) 4, a read-only memory (ROM) 5 for program storage, a random access memory (RAM) 6 for buffering the data, an address/data/control bus 7 for data transfer to/from the processor, and an D/A converter 8 that converts digital control signal generated by the controller into analog format. The analog control signal is applied to the process 9 (to a control valve, etc.). All elements of the controller interact with each other in a known manner. Some elements of the controller listed above (for example A/D and D/A converters) may be missing as well as the controller may also contain elements other than listed above—depending on specific requirements and features of the control system.

EXAMPLE

The following example illustrates an application of the method as well as is realized with the software, which actually implements the described algorithm and formulas.

Let the process be described by the following transfer function, which is considered unknown to the autotuner and is different from the process model used by the autotuner:

$$W(s)=0.5 \exp(-0.6 s)/(0.8 s^2+2.4 s+1)$$

The objective is to design a PI controller for this process with the use of first order plus dead time transfer function as an approximation of the process dynamics.

Figure 6:
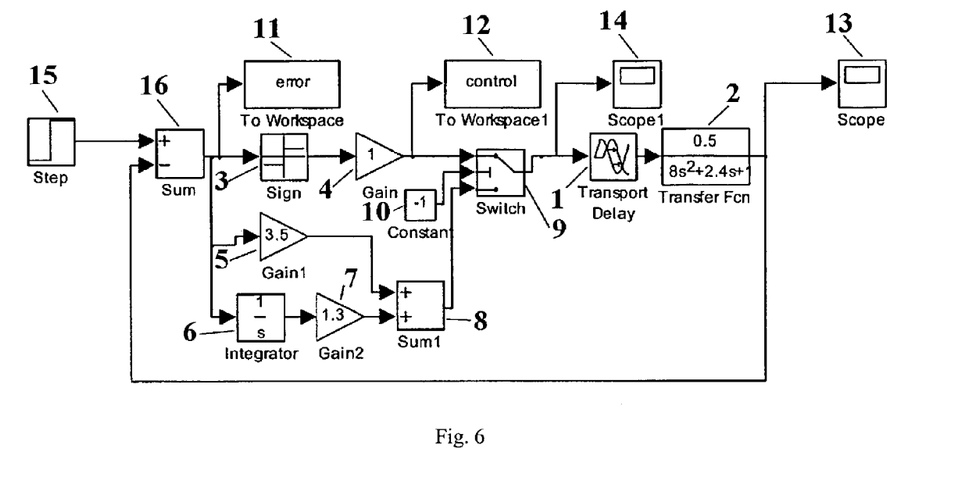
FIG. 6. Block diagram of the SIMULINK® model of the autotuning system.

Simulations of the asymmetric relay feedback test and of the tuned system are done with the use of software SIMULINK® (of MathWorks). The block diagram is depicted in FIG. 6. Blocks Transport Delay 1 and Transfer Fcn 2 realize process model. The control is switched from the relay control (blocks Sign 3 and Gain 4) for the asymmetric relay feedback test to PI control (blocks Gain1 5, Integrator 6, Gain2 7, Sum1 8) by the Switch 9 depending on the value of block Constant 10 (1 for the relay control and −1 for the PI control). Error signal and control signal are saved as data files named Error (block To Workspace 11) and Control (block To Workspace1 12) respectively. They are processed for calculation of the average output value, average control value and the frequency of oscillations. Process output and control signal can be monitored on Scope 13 and Scope1 14 respectively. Set point is realized as an input step function (block Step 15). Error signal is realized as difference between the set point signal and process output by block Sum 16.

Let us use first order plus dead time transfer function for the identification:

$$W_p(s)=K \exp(-\tau s)/(Ts+1)$$

Let us choose set point value (final value of the step function) $f_0=0.1$, amplitude of the relay $c=1$ and hysteresis $b=0$ and run the asymmetric relay feedback test. The following values of the oscillatory process are measured:

Frequency of oscillations $\Omega=1.903$,
Average value of the process output $y_0=0.0734$,
Average value of the control signal $u_0=0.1455$.

The following three equations should be solved for K, T, and τ:

$$\mathrm{Re}\, J(\Omega, K, T, \tau)=-\frac{1}{2}\frac{f_0-y_0}{u_0},$$

$$Im\, J(\Omega, K, T, \tau)=-\pi b/(4c)$$

$$K=y_0/u_0$$

where the formula of $J(\omega)$ is given by (9).

According to the algorithm described above, the following values of the process parameters are obtained from the above three equations:

$$K=0.5050,\ T=2.5285,\ \tau=0.9573.$$

Calculate the settings of the PI controller for the desired overshoot 10% and the above values of the identified parameters. As per formula (15) and Table 2 (with the use of linear interpolation), $K_i=1.349$ and $K_p=3.503$. Simulation of the system with the designed PI controller produces a step response with overshoot of about 12.5% and settling time about 2.05s (at level ±12.5%). Error between the desired overshoot (10%) and the actual overshoot (12.5%) is mainly due to the use of an approximate model of the process but is also due to the use of the quasi-optimal values of the PI controller settings instead of the optimal values.

I claim:

1. A method of tuning a controller for a process in a feedback control system comprising the steps of:
    (a) bringing the system into asymmetric self-excited oscillations via the introduction into the system an element having a nonlinear characteristic in series with the process, and applying a constant set point signal $f_0$ to the system, so that the error signal is the difference between the set point and the process output signal, the error signal is an input of the nonlinear element, and the output of the nonlinear element is a control signal for the process;
    (b) measuring the frequency of the oscillations $\Omega$, the average value of the process output signal $y_0$, and the average control signal $u_0$, and wherein the averages are taken over the period of the oscillations;
    (c) choosing the process model, parameters of which have unknown values;
    (d) identifying of the parameters of the process model with the measurements obtained;
    (e) tuning the controller in dependence on the identified parameters of the process model, wherein the original process model with unknown parameters is transformed into the form of a formula of the locus of a perturbed relay system (LPRS) being a complex function, which has same unknown parameters.

2. The method as recited in claim 1, wherein the nonlinear element is the hysteresis relay characteristic with positive, zero or negative hysteresis.

3. The method as recited in claim 1, wherein with the measurement obtained, the process model parameters identification step further includes the steps of:
    (a) calculation of the static gain of the process as:

$$K=y_0/u_0$$

(b) and calculation of one point of the LPRS $J(\Omega)$ of the process at the frequency of the oscillations $\Omega$ (which is the measured value of the LPRS at the frequency $\Omega$) as:

$$\mathrm{Re}\, J(\Omega) = -\frac{1}{2}\frac{f_0-y_0}{u_0}$$

$$Im\, J(\Omega)=-\pi b/(4c)$$

where $f_0$ if the set point, $y_0$ is the average value of the process output signal, $u_0$ is the average value of the control signal, b is a half of the hysteresis of the relay, c is the amplitude of the relay.

4. The method as recited in claim 1, wherein two unknown process model parameters are identified as the values that provide equality of the LPRS calculated on the basis of the chosen process model at the frequency of the oscillations to the point of the LPRS calculated through the measurements obtained via the asymmetric relay feedback test.

5. The method as recited in claim 1, wherein multiple asymmetric relay feedback tests are performed with different values of the hysteresis of the relay to measure several points of the LPRS.

6. The method as recited in claim 1, wherein in case of nonlinear character of the process, multiple asymmetric relay feedback tests are performed with decreasing values of the output amplitude of the relay to obtain a better local model of the process.

7. The method as recited in claim 1, wherein a combination of multiple asymmetric relay feedback tests with different values of the hysteresis of the relay and decreasing values of the output amplitude of the relay are performed to measure several points of the LPRS and obtain a better local model of the process in case of its nonlinear character.

8. The method as recited in claim 1, wherein the LPRS for a process model in the form of transfer function $W_p(s)$ of the process is calculated with the use of the following formula:

$$J(\omega) = \sum_{k=1}^{M_1} k^m(-1)^{k+1} \operatorname{Re} W_p(k\omega) + j\sum_{k=1}^{M_2} \operatorname{Im} W_p[(2k-1)\omega]/(2k-1)$$

where m=0 for type 0 servo systems (non-integrating process) and m=1 for type 1 servo systems (integrating process), ω is a frequency, $M_1$, $M_2$ are numbers sufficiently large for the above formula being an adequate approximation of respective infinite series.

9. The method as recited in claim 1, wherein the LPRS for at process model in the form of transfer function $W_p(s)$ of the process is calculated on the basis of expansion of the process transfer function $W_p(s)$ into partial fractions, calculation of the partial LPRSs with the use of formulas of the following Table and summation of the partial LPRSs:

Formulas of LPRS J(ω)

| Transfer function W(s) | LPRS J(ω) |
|---|---|
| K/s | $0 - j\pi^2 K/(8\omega)$ |
| K/(Ts + 1) | $0.5K(1 - \alpha \operatorname{cosech} \alpha) - j0.25 \pi K \operatorname{th}(\alpha/2)$, $\alpha = \pi/(T\omega)$ |
| K/[(T₁s + 1)(T₂s + 1)] | $0.5K[1 - T_1/(T_1 - T_2) \alpha_1 \operatorname{cosech} \alpha_1 - T_2/(T_2 - T_1) \alpha_2 \operatorname{cosech} \alpha_2)] -$ <br> $j0.25 \pi K/(T_1 - T_2) [T_1 \operatorname{th}(\alpha_1/2) - T_2 \operatorname{th}(\alpha_2/2)]$, $\alpha_1 = \pi/(T_1\omega)$, <br> $\alpha_2 = \pi/(T_2\omega)$ |
| K/(s² + 2ξs + 1) | $0.5K[(1 - (B + \gamma C)/(\sin^2\beta + \operatorname{sh}^2\alpha)] -$ <br> $j0.25 \pi K(\operatorname{sh}\alpha - \gamma\sin\beta)/(\operatorname{ch}\alpha + \cos\beta)$ <br> $\alpha = \pi\xi/\omega$, $\beta = \pi(1 - \xi^2)^{1/2}/\omega$, $\gamma = \alpha/\beta$, <br> $B = \alpha\cos\beta\operatorname{sh}\alpha + \beta\sin\beta\operatorname{ch}\alpha\alpha$, $C = \alpha\sin\beta\operatorname{ch}\alpha - \beta\cos\beta\operatorname{sh}\alpha$ |
| Ks/(s² + 2ξs + 1) | $0.5K[\xi (B + \gamma C) - \pi/\omega \cos\beta\operatorname{sh}\alpha]/(\sin^2\beta + \operatorname{sh}^2\alpha)] -$ <br> $j0.25 K \pi(1 - \xi^2)^{-1/2} \sin\beta/(\operatorname{ch}\alpha + \cos\beta)$ <br> $\alpha = \pi\xi/\omega$, $\beta = \pi(1 - \xi^2)^{1/2}/\omega$, $\gamma = \alpha/\beta$, <br> $B = \alpha\cos\beta\operatorname{sh}\alpha + \beta\sin\beta\operatorname{ch}\alpha$, $C = \alpha\sin\beta\operatorname{ch}\alpha - \beta\cos\beta\operatorname{sh}\alpha$, |
| Ks/(s + 1)² | $0.5K[\alpha(-\operatorname{sh}\alpha + \alpha\operatorname{ch}\alpha)/\operatorname{sh}^2\alpha - j0.25 \pi\alpha/(1 + \operatorname{ch}\alpha)]$, $\alpha = \pi/\omega$ |
| Ks/[(T₁s + 1) (T₂s + 1)] | $0.5K/(T_2 - T_1) [\alpha_2 \operatorname{cosech} \alpha_2 - \alpha_1 \operatorname{cosech} \alpha_1] -$ <br> $j0.25 K \pi/(T_2 - T_1) [\operatorname{th}(\alpha_1/2) - \operatorname{th}(\alpha_2/2)]$, $\alpha_1 = \pi/(T_1\omega)$, $\alpha_2 = \pi/(T_2\omega)$ |

10. The method as recited in claim 1, wherein the chosen model of the process is given by the transfer function $W_p(s)$ of 1ˢᵗ order with a dead time:

$$W_p(s) = K\exp(-\tau s)/(Ts+1)$$

where K is a static gain, T is a time constant, τ is a dead time.

11. The controller using the method recited in claim 1, wherein the controller is realized as a processor based device and all above formulas, the nonlinear element, and the tuning rules are realized as computer programs with the use of applicable programming languages.

12. The method as recited in claim 3, wherein the LPRS for a process model in the form of state space description for type 0, or non-integrating process servo systems is calculated with the use of the following formula:

$$J(\omega) = -0.5C\left[A^{-1} + \frac{2\pi}{\omega}\left(I - e^{\frac{2\pi}{\omega}A}\right)^{-1}e^{\frac{\pi}{\omega}A}\right]B + j\frac{\pi}{4}C(I + e^{\frac{\pi}{\omega}A})^{-1}\left(I - e^{\frac{\pi}{\omega}A}\right)A^{-1}B$$

where A, B and C are matrices of the following state space description of a relay system:

$$\dot{x} = Ax + Bu$$

$$y = Cx$$

$$u = \begin{cases} +1 & \text{if } \sigma = f_0 - y > b, \dot{\sigma} > 0 \\ -1 & \text{if } \sigma = f_0 - y < -b, \dot{\sigma} < 0 \end{cases}$$

where A is an n×n matrix, B is an n×1 matrix, C is an 1×n matrix, $f_0$ is the set point, σ is the error signal, 2b is the hysteresis of the relay function, x is the state vector, y is the process output, u is the control, n is the order of the system;

or the LPRS for type 1, or integration process, servo systems is calculated with the use of the following formula:

$$J(\omega) = 0.25CA^{-2}\left\{(I - D^2)^{-1}\left[D^2 - \left(I + \frac{4\pi}{\omega}A\right)D + D^3 - I\right] + D - I\right\}B +$$

-continued
$$j\frac{\pi}{8}CA^{-1}\left\{\frac{\pi}{\omega}+A^{-1}\left[(I-D^2)^{-1}\cdot(3D^2-3D-D^3+I)-D+I\right]\right\}B,$$

where $$D=e^{\frac{\pi}{\omega}A},$$

A, B and C are matrices of the following state space description of a relay system:

$$\dot{x}=Ax+Bu$$

$$\dot{y}=Cx-f_0$$

$$u=\begin{cases}+1 & \text{if } \sigma=-y>b, \dot{\sigma}>0 \\ -1 & \text{if } \sigma=-y<-b, \dot{\sigma}<0\end{cases}$$

where A is an (n−1)×(n−1) matrix, B is an (n−1)×1 matrix, C is an 1×(n−1) matrix, n is the order of the system.

13. The method as recited in claim 3, wherein if an external unknown constant or slowly changing disturbance is applied to the process, each static gain of the process is calculated on the basis of a pair of asymmetric relay feedback tests, each with different average control signal value, as a quotient of the increment of the average process output signal and increment of the average control signal.

14. The method as recited in claim 5 or 7, wherein with the measurement obtained, the process model parameters identification step further includes the steps of:
(a) calculation of the static gain of the process as:

$$K=\frac{1}{N}\sum_{k=1}^{N}\frac{y_{0k}}{u_{0k}};$$

(b) and calculation of N points of the LPRS $J(\Omega_k)$ of the process at the frequencies of the oscillations $\Omega_k$, k=1, 2, . . . , N (which are the measured values of the LPRS at frequencies $\Omega_k$, k=1, 2, . . . , N) as:

$$\text{Re } J(\Omega_k)=-\frac{1}{2}\frac{f_0-y_{0k}}{u_{0k}}$$

$Im\ J(\Omega_k)=-\pi b_k/(4c)$
where $\Omega_k$, $y_{0k}$, $u_{0k}$, $b_k$ (=1, 2 . . . , N) are values of $\Omega$, $y_0$, $u_0$, and b for k-th asymmetric relay feedback test, $f_0$ if the set point, $y_0$ is the average value of the process output signal, $u_0$ is the average value of the control signal, b is a half of the hysteresis of the relay, c is the amplitude of the relay.

15. The method as recited in claim 5 or 7, wherein 2N unknown parameters of the process model are found as the solution of 2N nonlinear algebraic equations, which are obtained as conditions of equality of the N measured points via the asymmetric relay feedback tests of the LPRS the process to the N points of the LPRS calculated on the basis of the chosen process model at the frequencies of the oscillations.

16. The method as recited in claim 5 or 7, wherein the unknown parameters of the process model are found through the least squares criterion or another criterion fitting of the LPRS expressed via certain process model parameters to the LPRS points obtained through the asymmetric relay feedback tests.

17. The method as recited in claim 10, wherein the corresponding LPRS of the process is given by:

$$J(\omega)=\frac{K}{2}(1-\alpha e^{\gamma}\cosech\alpha)+j\frac{\pi}{4}K\left(\frac{2e^{-\alpha}e^{\gamma}}{1+e^{-\alpha}}-1\right)$$

where $\alpha=\pi/\omega T$, $\gamma=\tau/T$.

18. The method as recited in claim 10, wherein with the measurements of the frequency of the oscillations $\Omega$, average output signal $y_0$ and average control signal $u_0$ obtained, calculation of the parameters K, T and τ of the process transfer function comprises the following steps:
(a) calculating the static gain K as:

$$K=\frac{y_0}{u_0};$$

(b) solving the following equation for α:

$$\frac{y_0}{f_0}=\frac{1-e^{-\alpha}}{\alpha};$$

(c) calculating the time constant T as:

$$T=\frac{\pi}{\alpha\Omega};$$

(d) calculating the dead time τ as:

$$\tau=T\ln\left[\frac{1}{2}(e^{\alpha}+1)\right]$$

19. The method as recited in claim 10, wherein the proportional gain $K_p$ and the integrator gain $K_i$ in PI control are calculated for desired overshoot being a constraint, proportional gain $K_p$ and integrator gain $K_i$ are sought as a solution of the parameter optimization problem with settling time being an objective function.

20. The method as recited in claim 10, wherein for the desired overshoot being a given value, the calculation of the proportional gain $K_p$ and the integrator gain $K_i$ comprises the following steps: (a) calculation of the normalized values of $K_p$ and $K_i$, denoted as $K^0_p$ and $K^0_i$ respectively, as follows:
first the normalized time constants are calculated as:
for desired overshoot 20% integrator time constant is calculated as:

$T^0_i=1.60\tau/T$;

for desired overshoot 10%, $T^0_i=1.80\tau/T$;
for desired overshoot 5%, $T^0_i=1.95\tau/T$ with intermediate values determined by using interpolation;
after that the normalized gains $K^0_i$ are to be calculated as reciprocals of the respective time constants as:

$K^0_i=1/T^0_i$ wherein the normalized proportional gain $K^0_p$ is taken from the following Table with intermediate values determined by using interpolation:

| | Normalized proportional gain settings | | | | | | | | | | |
|---|---|---|---|---|---|---|---|---|---|---|---|
| Overshoot [%] | τ/T = 0.1 | τ/T = 0.2 | τ/T = 0.3 | τ/T = 0.4 | τ/T = 0.5 | τ/T = 0.6 | τ/T = 0.7 | τ/T = 0.8 | τ/T = 0.9 | τ/T = 1.0 | τ/T = 1.5 |
| 20 | $K^0_p$ = 7.177 | 3.702 | 2.564 | 2.007 | 1.683 | 1.473 | 1.329 | 1.225 | 1.146 | 1.086 | 0.915 |
| 10 | $K^0_p$ = 5.957 | 3.058 | 2.120 | 1.673 | 1.419 | 1.258 | 1.148 | 1.068 | 1.008 | 0.963 | 0.833 |
| 5 | $K^0_p$ = 5.203 | 2.624 | 1.823 | 1.483 | 1.294 | 1.170 | 1.082 | 1.014 | 0.964 | 0.924 | 0.808 |

(b) The proportional gain $K_p$ and integrator gain $K_i$ are calculated as $K_p = K^0_p/K$ and $K_i = K^0_i/T/K$, where K is the static gain of the process, T is the time constant of the process.

* * * * *